US010522047B2

(12) United States Patent
Giusti et al.

(10) Patent No.: US 10,522,047 B2
(45) Date of Patent: Dec. 31, 2019

(54) GUIDANCE SYSTEM OF A DRONE

(71) Applicants: PARADOX ENGINEERING SA, Novazzano (CH); SUPSI (SCUOLA UNIVERSITARIA PROFESSIONALE DELLA SVIZZERA ITALIANA), Manno (CH)

(72) Inventors: Alessandro Giusti, Lugano (CH); Luca Maria Gambardella, Tradate (IT); Giovanni Minetti, Coldrerio (CH); Jérôme Guzzi, Personico (CH)

(73) Assignees: PARADOX ENGINEERING SA, Novazzano (CH); SUPSI (SCOULA UNIVERSITARIA PROFESSIONALE DELLA SVIZZERA ITALIANA), Manno (CH)

( * ) Notice: Subject to any disclaimer, the term of this patent is extended or adjusted under 35 U.S.C. 154(b) by 161 days.

(21) Appl. No.: 15/545,631

(22) PCT Filed: Jan. 15, 2016

(86) PCT No.: PCT/IB2016/050192
§ 371 (c)(1),
(2) Date: Jul. 21, 2017

(87) PCT Pub. No.: WO2016/116841
PCT Pub. Date: Jul. 28, 2016

(65) Prior Publication Data
US 2018/0018884 A1    Jan. 18, 2018

(30) Foreign Application Priority Data

Jan. 23, 2015   (CH) ...................................... 0082/15

(51) Int. Cl.
*G08G 5/00*          (2006.01)
*B60L 53/60*         (2019.01)
(Continued)

(52) U.S. Cl.
CPC ............ *G08G 5/0069* (2013.01); *B60L 53/60* (2019.02); *B60L 53/80* (2019.02); *B64C 39/024* (2013.01);
(Continued)

(58) Field of Classification Search
CPC .. G08G 5/0069; G08G 5/0025; G08G 5/0026; G08G 5/0013; B64C 39/024;
(Continued)

(56) References Cited

U.S. PATENT DOCUMENTS 9,087,451 B1 *  7/2015  Jarrell .................. G08G 5/0069
9,527,605 B1 * 12/2016  Gentry ...................... B64F 1/12
(Continued)

OTHER PUBLICATIONS

International Search Report, dated Jun. 30, 2016, for PCT/IB2016/050192, 3 pages.
(Continued)

*Primary Examiner* — Dale Moyer
(74) *Attorney, Agent, or Firm* — Seed IP Law Group LLP

(57) ABSTRACT

A guidance system for a drone is described, said system comprising: a plurality of poles fixed to the ground and associated with a private or public electric power grid; a plurality of devices fixed to the poles and powered by the electric power grid, said devices being interconnected in a wireless network and comprising a radio communication module for communicating with the drone; a controller connected to the wireless network and intended to program a flight path of the drone between two or more poles by transmitting configuration commands to the respective devices of the wireless network, for configuring the radio communication modules, wherein the radio communication module of one pole in the flight path is configured to guide the drone towards the radio communication module of a following pole in the flight path.

14 Claims, 2 Drawing Sheets

(51) Int. Cl.
*G05D 1/02* (2006.01)
*B64C 39/02* (2006.01)
*B60L 53/80* (2019.01)
*G01S 1/68* (2006.01)

(52) U.S. Cl.
CPC ......... *G05D 1/0202* (2013.01); *G08G 5/0013* (2013.01); *G08G 5/0026* (2013.01); *G08G 5/0052* (2013.01); *G01S 1/68* (2013.01)

(58) Field of Classification Search
CPC .... B64C 2201/066; B60L 53/60; B60L 53/80; G05D 1/0202; G01S 1/68
See application file for complete search history.

(56) References Cited

U.S. PATENT DOCUMENTS

| | | |
|---|---|---|
| 2014/0032034 A1 | 1/2014 | Raptopoulos et al. |
| 2015/0162867 A1* | 6/2015 | Meringer ................ H02S 20/20 362/183 |
| 2015/0336669 A1* | 11/2015 | Kantor ................ G01C 21/3415 701/3 |
| 2016/0209839 A1* | 7/2016 | Hoareau .............. G05D 1/0027 |
| 2017/0015415 A1* | 1/2017 | Chan .................... B64C 39/024 |

OTHER PUBLICATIONS

Written Opinion, dated Jun. 30, 2016, for PCT/IB2016/050192, 6 pages.

\* cited by examiner

GUIDANCE SYSTEM OF A DRONE

FIELD OF APPLICATION

The present invention relates to a guidance system for a drone.

In particular the present invention relates to a system of the aforementioned type for automating the flight of a drone in an urban, extra-urban or private environment.

The invention also relates to a method for guiding a drone and to a drone intended to be guided by the aforementioned system.

PRIOR ART

As is known, a drone or RPV (Remotely Piloted Vehicle) is a pilotless remotely controlled aircraft, for example used for recognition and surveillance operations.

Guiding of the drone is at present performed by means of a remote control device.

In view of the recent commercial interest in drones, applications have also been developed for smartphones or tablets which are easy to operate and intuitive. These applications are based on a control software which have performance features limited by the CPUs of the smartphone or tablet, but are in any case able to analyze the data of numerous sensors, such as accelerometers, gyroscopes, magnetometers, etc., and manage in real time all the motors of the drone, thus allowing a stable flight to be maintained and any disturbances of the flying position to be compensated for.

The aforementioned remote control devices and applications may be used with good results for HD-quality overhead photography or for games, but the development of proper automated applications for the drone, such as the delivery of merchandise or the video monitoring of certain areas, is hindered by a number of factors, first and foremost the need to automate flying of the drone, allowing flying to be performed independently of human control and outside of human visual range.

Some drones of the professional type are provided with an automatic piloting system which is very closely related to those used by airlines and therefore has a certain complexity and cost. The system allows the storage on-board the drone of a route by means of GPS positions.

However, it is still affected by problems which prevent the use of drones in practical applications. For example, programming of this piloting system for automating the flight of the drone in an urban environment requires the detection of a plurality of GPS coordinates in loco and the storage of these coordinates in the drone memory, something which requires time and also involves other safety-related problems, including the need to check for possible collisions with drones programmed with their own pilot system or the absence of a ground reference point, to be used in the event of recovery of the drone.

Moreover, the absence of or limited availability of GPS connectivity in some zones and the insufficient precision thereof do not allow the known system to be used in an urban environment where further obstacles hindering flight are present, such as tall movable machinery, for example cranes, or where new buildings may appear in a relatively short amount of time, forming sudden obstacles which hinder flight. In view of these problems it is almost impossible to comply with certain local, regional or national regulations, such as the prohibition of flights over a public meeting or the need to ensure a connectivity which is always secure and reliable.

All these problems in any case result in the need for the known automatic piloting systems to be accompanied by operator control. The life of the drone batteries is a major limitation, since it requires manual action to carry out replacement or perform recharging, this being a further impediment to the real automation of the applications in the field or over long distances. US2014/0032034 is an example of a guidance system for a drone, according to the prior art.

The technical problem forming the basis of the present invention is to devise a guidance system for a drone which is able to improve the automation and safety of flying, allowing the use of drones to be extended to a wide range of applications in an urban, extra-urban or private environment, substantially overcoming the drawbacks which currently affect the known systems.

SUMMARY OF THE INVENTION

Figure 1:
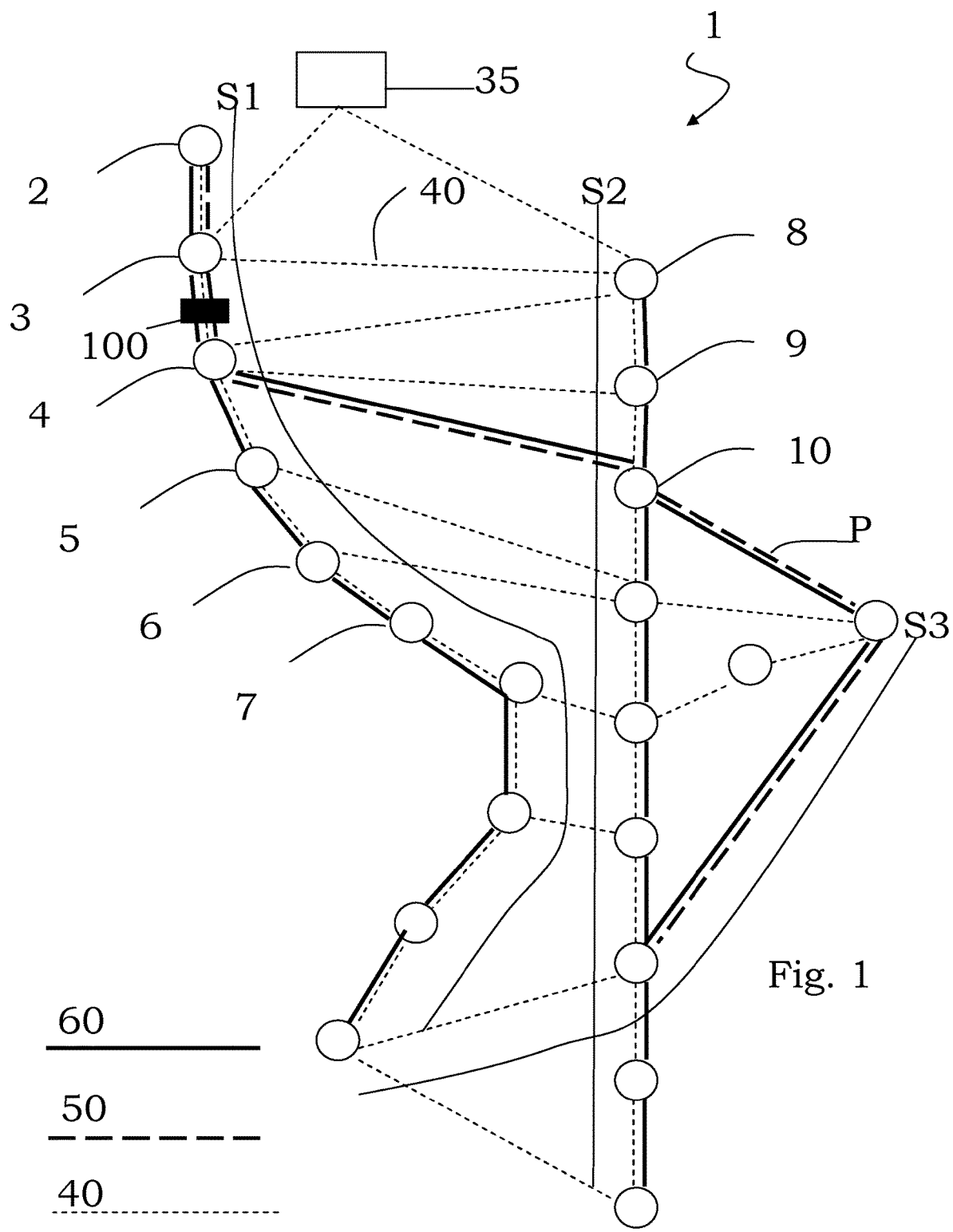
FIG. 1 shows in schematic form a guidance system for a drone according to the present invention.

The idea underlying the present invention is to fix a plurality of electronic devices on a plurality of structural elements fixed to the ground along a pre-existing land communication network, for example an urban or extra-urban roadway or railway network, and to configure some of the electronic devices so as to emit flight commands for a drone, essentially by transmitting to the drone flight instructions from a device, at a predefined altitude above the structural elements and along the pre-existing communication network. The structural elements are associated with a pre-existing electric power grid, for example they are the lamp posts of a roadway network or the pylons of a railway line and, advantageously, the devices are powered by the same electric grid associated with the structural elements.

In particular, the devices are connected in a wireless network, for example in a Mesh network, by means of which they form a virtual aerial communication network for the drone. The virtual aerial communication network corresponds to all the possible radio connections between the devices. The flight path of the drone is obtained from the configuration of a predetermined path chosen from among all the possible paths along the virtual aerial communication network. The path is formed by a plurality of nodes, corresponding to the devices configured for the flight path, and sections situated between one node and the following one. The instructions for flight of the drone from one node to the following one are sent from the device fixed to the structural element.

On the basis of the present idea, the technical problem is solved by a guidance system for a drone, comprising:

a plurality of structural elements, fixed to the ground and associated with a private or public electric power grid, preferably poles;

a plurality of devices fixed to the poles and powered by the same electric power grid associated with the poles, the devices being connected together in a wireless network and comprising a radio communication module for communicating with the drone;

a controller connected to the wireless network and intended to program a flight path P of the drone between two or more poles, preferably at a predefined flying altitude above the poles, by transmitting configuration commands to the devices fixed to said two or more poles, for configuring the radio communication modules, wherein the radio communication module of one pole in the flight path is configured to guide the drone towards the radio communication module of a following pole in the flight path.

In one embodiment of the invention, the poles are for example the pylons of a railway network and the power grid is branched off from the electric railway network. In another embodiment, the poles are public lamp posts of a roadway communication network.

The wireless network is preferably a Mesh network. For example, the wireless network is a pre-existing Smartgrid used for regulating the illumination of lamp posts in an urban environment.

The radio communication modules are configured to guide the drone along the flight path P and form a second wireless network. The second wireless network may have characteristics different from the first wireless network. For example, according to one aspect of the invention, the latency of the two networks is different or, according to another aspect of the invention, the second network may have a bandwidth wider than the bandwidth of the first wireless network.

The device is therefore provided with two different radio interfaces, a first interface operating on the first wireless network and a second interface operating on the second network.

The second wireless network forms a control and monitoring network since it is adapted to send to the drone information for piloting it along the flight path and to receive information acquired from the drone; this information is transferred from the second wireless network to the first wireless network and, via the latter, to the various devices for monitoring purposes.

At least one of the devices fixed to the pole comprises a landing base for the drone and preferably also comprises an Ethernet interface of the wireless or wired type which can be connected to the drone, in order to transfer data from or to the drone. Moreover, preferably, at least one of the devices provided with a landing base comprises means for recharging or replacing a battery of the drone. Advantageously, said means allow the autonomy of the drone to be prolonged so as to cover many long flights using the same drone, without any human action.

Again according to the present invention, several devices provided with a landing base form a third network, for example of the wireless type, having a bandwidth greater than the bandwidth of the first wireless network and intended for the transmission of data. In this case, the device is therefore provided with a third wireless interface operating on the third wireless network. In another variation of embodiment, the devices provided with a landing base are connected in a network based on a technology different from the aforementioned wireless networks, such as optical fibre or Ethernet over copper or PLC technology.

It is also envisaged programming the devices so as to guide the drone to the ground or cause it take off from the ground, at a given pole. Preferably the flying altitude is therefore reached by causing the drone to take off vertically and parallel to a pole, its descent onto the ground also being performed in this way.

According to a variation of embodiment landing is performed by means of a system for allowing the drone to descend to the ground from a landing base, comprising means for engaging the drone and means for performing sliding from the landing base down to the ground or to a predetermined height, within human reach. Advantageously, the descent system may also be programmed and automated, thus simplifying also the drone landing operation, envisaged for example for maintenance purposes. Moreover, the drone may be raised from the ground as far as the landing base by means of the aforementioned system, so as to take off directly from the base and not from the ground.

The system according to the present invention comprises optionally a cable network between the poles, the cables being intended to be engaged by the drone, for instance in case of breakdown during flight. The cable network may be provided with an interface for acquisition and/or transfer of data from/to the drone.

Furthermore, a physical safety network, which is preferably elastic, is extended between the poles underneath a flight altitude of the drone and is intended to catch the drone in the event of it falling to the ground.

According to one aspect of the present invention and as more specifically indicated in the description below, the programming of the flight path in the controller comprises the configuration of one or more timed stops of the drone, at a pole, to avoid collision with other drones.

The technical problem according to the present invention is also solved by a drone intended to be guided by the aforementioned system and by a corresponding piloting method, as claimed.

Further characteristic features and advantages of the present invention will become clear from the description below provided solely by way of example with reference to the attached drawings.

DETAILED DESCRIPTION

With reference to FIG. 1 this shows in schematic form a guidance system according to the present invention, denoted overall by the reference number 1, and comprising a plurality of elements fixed to the ground, for example poles 2-10 consisting of lamp posts situated along a roadway network or pylons of a railway line.

Without limiting the scope of protection of the invention, the diagram shown in FIG. 1 relates in particular to a roadway network, comprising n (three) roads S1-S3, with any intersections, for example the intersection between the road S2 and S3. The poles are associated with an electric power line intended, for example, to power the lighting unit of the lamp post and branched off from of a per se pre-existing urban power grid.

Figure 2:
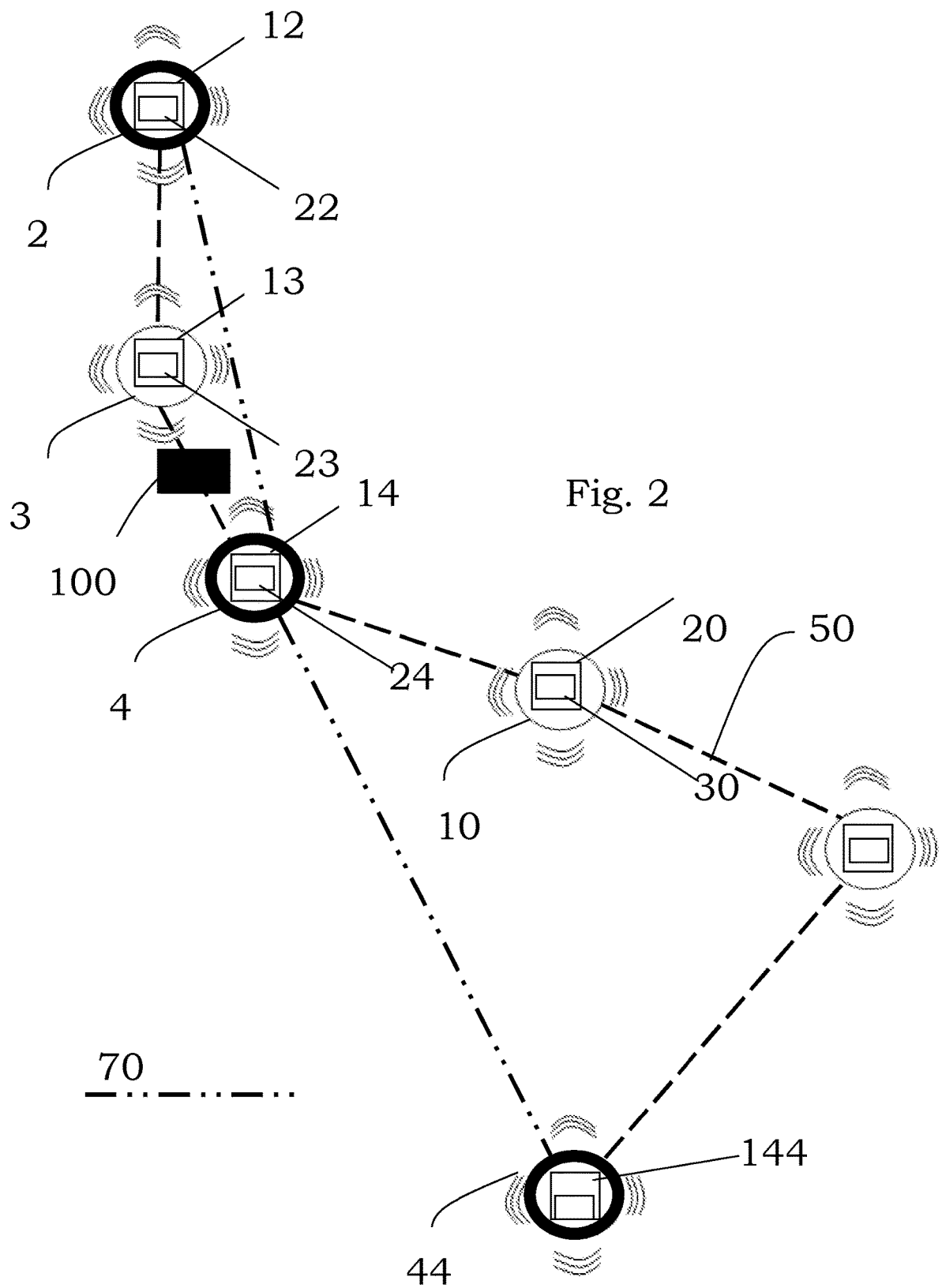
FIG. 2 shows an enlarged view of a portion of the guidance system for a drone according to FIG. 1.

Some of the poles 2-4, 10 in FIG. 1 are shown on a larger scale in FIG. 2, which also shows in schematic form, for each pole, an electrical device 12-14, 20 which is fixed at the top end of the pole and provided with a radio communication interface for communication in a first wireless network. All the devices 12-20 are provided with such a radio interface.

The latter has a predetermined coverage range which allows the device 12-20 to communicate with several other devices 12-20 within its radius of action and to form, with all the devices 12-20 fixed to the poles, the first wireless network denoted by the reference number 40 in FIG. 1 and indicated by a first broken line.

The wireless network 40 forms a virtual aerial communication network which comprises all the possible paths which may be configured as flight paths Pi.

In this connection, for configuration of a specific flight path P, a control device, i.e., controller 35, is provided, said controller being connected to the wireless network and intended to transmit programming commands to the devices 12-20. For example, in the diagram shown in FIG. 1, the controller 35 has configured a flight path P after transmitting programming commands to the devices 12, 13, 14, 20.

By way of example, these commands may comprise a code for identifying the drone to be guided and, for each of the devices 12, 13, 14, a code identifying a following device 13, 14, 20 along the flight path P, towards which drone may be guided, and/or the flight coordinates, along with any deviation intervals.

Advantageously, according to an aspect of the present invention, the first wireless network 40 may be a pre-existing urban Smartgrid, i.e., already implemented and operative, for example for regulating the lighting of the lamp posts along the roadway network.

The programming commands received by the device 12, 13, 14, 20 via the first wireless network 40 are processed in the same device so as to program a radio communication module 22, 23, 24, 30 for communicating with the drone.

In the figures, the drone is indicated by 100, being shown along a section of its flight path between two lamp posts 3, 4, preferably at a predefined height above the lamp posts. Along this section, the drone 100 has already received the flight commands from the device 13 and is directed towards the device 14 where it will receive the flight commands for the following section 4-5 of the flight path P, i.e., for displacement from pole 4 to pole 5.

Preferably, the devices involved in the flight path P form a second wireless network, denoted in FIG. 2 by 50 and indicated by a second type of broken line, substantially corresponding to the flight path already indicated by P in FIG. 1. Some devices, for example the device 12, 14 in FIG. 2, are designed to allow landing of the drone 100 for various purposes, such as recharging of the drone battery or replacement thereof with a battery available in the vicinity of the pole. Advantageously, a discharged battery deposited by a drone in the vicinity of a pole is recharged by means of the power grid associated with the pole and then made available for other drones.

Landing of a drone on one of the devices 12, 14 provided with a base is also envisaged for other functions, such as transfer of the data stored in the drone 100 to the device 12, 14 or, vice versa, transfer of the data from the device 12, 14 to the drone 100, or for performing timed stops of the drone 100 at the pole 2, 4, programmed by the controller 35 or the devices 12-20. The stops have the function of regulating the traffic of several drones 100, basically providing a traffic light system for drones.

This system is for example installed as an ad hoc device in the wireless network or in the vicinity of one of the devices 12-20 already present and is necessary especially at possible intersections between the flight paths programmed by the controller.

Moreover, landing of a drone on a base is envisaged for exchanging transported merchandise between drones, namely for depositing merchandise transported by a first drone and for acquisition of said merchandise by a second drone which arrives after the first drone on the landing base.

In this connection, the guidance system according to the present invention also envisages programming the transportation of merchandise or information by means of relaying between drones. For example, with reference to FIG. 2, in order to carry out a part of the relaying operation from a starting point on a flight path (pole 2) to a following point or terminal (pole 44), it is possible to guide a first drone 100 from the pole 2 to an intermediate pole 4 along the flight path P, provided with landing base, and program unloading of the merchandise at the intermediate pole 4. At the pole 4, a second drone (not shown in the figures) may be programmed to acquire merchandise and transport it the next pole 44 also provided with a landing base, where exchange with a further drone or the definitive delivery of the merchandise is performed (if the pole 44 is the end pole along the flight path P).

Preferably, the devices provided with landing base also comprise an Ethernet interface of the wireless or wired type intended for fast transfer of data from/to the drone 100.

According to another aspect of the present invention, the devices provided with landing base form a third network, indicated by 70 in FIG. 2, having a bandwidth greater than the first wireless network 40 and the second wireless network 50 and intended to transfer the data acquired from the drones (handover).

It should merely be pointed out that the third wireless network 70 and the second wireless network 40 are shown separately, respectively, in FIGS. 2 and 1, only for the sake of clarity thereof, but the second and third networks may be simultaneously implemented and operative in the guidance system 1, together with the network 50.

As an optional addition a cable network is provided, indicated by 60 in FIG. 1, said network being used to receive the drone 100 if it is unable to reach the landing base or complete an aerial section between two poles. According to one aspect of the invention, the cable network 60 may be used also for data transfer.

Furthermore, a protection network (not shown) is extended between the poles, at an altitude lower than the flight altitude of the drone 100, for catching the drone in the event of it suddenly breaking down and falling to the ground. Advantageously the protection network may be used to resolve other safety issues, for example by providing a protection system for anyone passing underneath the lamp posts or travelling along the roadway network and also preventing any damage to the drone in the event of impact with the ground.

The invention claimed is:

1. A guidance system for a drone, comprising:
   a plurality of devices being interconnected in a wireless network and comprising a radio communication module for communicating with the drone;
   a controller connected to the wireless network, the controller operative to program a flight path of the drone by transmitting configuration commands to the respective devices of the wireless network, for configuring the radio communication modules, characterized by the fact that:
   a plurality of poles are fixed to the ground and powered by a private or public electric power grid;
   each of said devices is fixed to one of said poles and is powered by the electric power grid;
   said flight path is a path between two or more poles; and
   said configuration commands comprise a code for identifying the drone and, for each of said devices, a code identifying a following device along said flight path towards which guiding the drone and flight coordinates with deviation intervals, and wherein the radio communication module of one device on a pole in the flight path is configured to guide the drone towards the radio communication module of the following device on a pole in the flight path.

2. The guidance system according to claim 1, wherein said poles are pylons of a railway network and said electric power grid is branched off from the electric railway network.

3. The guidance system according to claim 1, wherein said poles are the public lamp posts of a roadway communication network.

4. The guidance system according to claim 1, wherein said wireless network is a Mesh network.

5. The guidance system according to claim 1, wherein the modules configured to guide the drone along the flight path form a second wireless network with different functional features compared to the first wireless network.

6. The guidance system according to claim 1, characterized in that at least one of said devices comprises a landing base for the drone.

7. The guidance system according to claim 6, wherein at least one of the devices provided with a landing base comprises a wireless or wired Ethernet interface connected to the drone so as to transfer data from or to the drone.

8. The guidance system according to claim 6, wherein at least one of the devices provided with a landing base comprises means for recharging or replacing a battery of the drone or an area for exchanging merchandise between drones.

9. The guidance system according to claim 6, wherein a plurality of the devices provided with a landing base form a third wireless network with a bandwidth wider than a bandwidth of the wireless network for data transmission.

10. The guidance system according to claim 1, further comprising a cable network between said poles, the cables of said cable network being engaged by the drone in case of breakdown during flight.

11. The guidance system according to claim 1, comprising a physical safety network extending between the poles below a flight altitude of the drone and intended to catch the drone in the event of it falling to the ground.

12. The guidance system according to claim 1, wherein the programming of said flight path in the controller comprises programming one or more timed stops of the drone, at a pole, to avoid collisions with other drones.

13. A method for guiding a drone, comprising the steps of:
connecting a plurality of devices in a wireless network;
programming a flight path P of the drone by transmitting configuration commands, from a controller to the respective devices of the wireless network, for configuring radio communication modules, of said devices characterized by fixing the devices to poles at the ground, the poles being associated with a public or private electric power grid, and powering the devices with the same electric power grid associated with the poles;
wherein said configuration commands include a code for identifying the drone and, for each of said devices, a code identifying a following device along said flight path towards which guiding the drone, and wherein the radio communication module of one device on a pole in the flight path guides the drone towards the radio communication module of the following device on a pole in the flight path.

14. A system, comprising:
a drone; and
a guidance system for the drone, the guidance system comprising:
a plurality of devices being interconnected in a wireless network and comprising a radio communication module for communicating with the drone;
a controller connected to the wireless network, the controller operative to program a flight path of the drone by transmitting configuration commands to the respective devices of the wireless network, for configuring the radio communication modules, characterized by the fact that:
a plurality of poles are fixed to the ground and powered by a private or public electric power grid;
each of said devices is fixed to one of said poles and is powered by the electric power grid;
said flight path is a path between two or more poles, and
said configuration commands comprise a code for identifying the drone and, for each of said devices, a code identifying a following device along said flight path towards which guiding the drone and flight coordinates with deviation intervals, and wherein the radio communication module of one device on a pole in the flight path is configured to guide the drone towards the radio communication module of the following device on a pole in the flight path,
wherein the drone is adapted to be piloted by the guidance system, the drone operative to receive flight commands from the radio communication modules of the devices fixed to the poles.

* * * * *